US012743159B2

(12) United States Patent
Singh et al.

(10) Patent No.: US 12,743,159 B2
(45) Date of Patent: Sep. 22, 2026

(54) WEARABLE DEVICE FOR 3D POSITIONAL TRACKING AND GESTURE RECOGNITION

(71) Applicant: ULTRAHUMAN HEALTHCARE PVT LTD, Bangalore South (IN)

(72) Inventors: Jaskaran Singh, Bangalore South (IN); Vatsal Singhal, Bangalore South (IN)

(73) Assignee: ULTRAHUMAN HEALTHCARE PVT LTD, Bangalore South (IN)

( * ) Notice: Subject to any disclaimer, the term of this patent is extended or adjusted under 35 U.S.C. 154(b) by 0 days.

(21) Appl. No.: 19/354,200

(22) Filed: Oct. 9, 2025

(65) Prior Publication Data

US 2026/0178128 A1 Jun. 25, 2026

Related U.S. Application Data

(63) Continuation of application No. PCT/IN2025/050405, filed on Mar. 20, 2025.

(30) Foreign Application Priority Data

Mar. 28, 2024 (IN) ............................ 202441025670

(51) Int. Cl.

*G06F 3/01* (2006.01)
*G06N 3/0442* (2023.01)
*H04W 4/80* (2018.01)

(52) U.S. Cl.

CPC .............. *G06F 3/017* (2013.01); *G06F 3/014* (2013.01); *G06N 3/0442* (2023.01); *H04W 4/80* (2018.02)

(58) Field of Classification Search

CPC .......... G06F 3/017; G06F 3/014; G06F 3/011; G06N 3/0442; G06N 3/02; H04W 4/80;

(Continued)

(56) References Cited

U.S. PATENT DOCUMENTS

2021/0025976 A1 1/2021 Chandel et al.
2024/0012479 A1 1/2024 Qiu et al.

(Continued)

FOREIGN PATENT DOCUMENTS

CN 215268253 U 12/2021
IN 202341013441 A 3/2023
WO 2022027435 A1 2/2022

OTHER PUBLICATIONS

Hochreiter S., et al., "Long Short-Term Memory," MIT, published 1997 (Year: 1997).*

(Continued)

*Primary Examiner* — Eric J Yoon
(74) *Attorney, Agent, or Firm* — Workman Nydegger

(57) ABSTRACT

A device for 3D positional tracking and gesture recognition of a user is described. The device comprising a pair of smart rings designed for spatial computing input. The smart rings include inertial measurement unit for real-time 3D positional tracking. The smart rings incorporate a machine learning model for gesture recognition of the user. Further, the smart rings transmit the raw motion data to the user device via the Bluetooth communication unit in real-time that may be processed to predict additional gestures for the spatial computing applications. Further, the device provides intuitive and precise control in virtual and augmented reality environments. Further, the smart rings include a pressure touch or touch-sensitive region to add versatility to the input method.

11 Claims, 2 Drawing Sheets

(58) Field of Classification Search
CPC ......... G06T 19/006; G06T 7/20; G01C 21/16; G01C 21/188; G01C 21/06; G01C 21/10
See application file for complete search history.

(56) References Cited

U.S. PATENT DOCUMENTS

2025/0095022 A1* 3/2025 Manna ............... G06Q 30/0242
2025/0259003 A1* 8/2025 Aggarwal ............. G06F 40/279
2026/0097264 A1* 4/2026 Erickson ............ A63B 24/0003

OTHER PUBLICATIONS

Wagstaff, B. et al., "LSTM-Based Zero-Velocity Detection for Robust Inertial Navigation," published 2018 (Year: 2018).*
Mousavi, Seyed Ahmadreza et al., "Wearable Smart Rings for Multifinger Gesture Recognition Using Supervised Learning", IEEE Transactions on Instrumentation and Measurement, vol. 72, Aug. 25, 2023, 12 pages.
International Search Report from corresponding PCT Application No. PCT/IN2025/050405, Aug. 21, 2025.
Indian Search Report from corresponding Indian Patent Application No. IN202441025670, Aug. 26, 2025.

* cited by examiner

WEARABLE DEVICE FOR 3D POSITIONAL TRACKING AND GESTURE RECOGNITION

FIELD OF INVENTION

The present invention relates to a wearable device, and specifically relates to a device for 3D positional tracking and gesture recognition of a user.

BACKGROUND

The field of wearable technology has seen significant advancements in recent years, with a growing focus on enhancing user interaction and immersion in various spatial computing applications, such as virtual reality (VR), augmented reality (AR), and mixed reality (MR). A critical component of these technologies is the ability to accurately track the user's three-dimensional (3D) position and recognize their gestures in real-time.

Traditional systems often rely on external cameras, sensors, or markers to track movement and gestures. However, these systems can be limited by environmental factors, such as lighting conditions or occlusion. Moreover, the requirement for external equipment can restrict the user's mobility and limit the applicability of the technology in different settings.

Thus, there is a need for a wearable device that overcomes these limitations by providing precise 3D positional tracking and gesture recognition capability. Such a device would offer greater freedom of movement and versatility, enabling users to interact with digital content in a more natural and intuitive manner.

OBJECTS OF THE INVENTION

An objective of the present invention is to provide a smart wearable capable of tracking 3D position and gesture recognition of a user.

Another objective of the invention is to provide a smart wearable capable of predicting gestures and movements.

Yet another objective of the invention is to provide a smart wearable capable of interpreting gestures for various action within a virtual or augmented reality environments.

Still another objective of the invention is to provide a smart wearable capable of using machine learning techniques for interpreting gestures and 3D position of the user.

SUMMARY OF THE INVENTION

This summary is provided to introduce aspects related to the present invention of protective casing for rings and the aspects are further described below in the detailed description. This summary is not intended to identify essential features of the claimed subject matter nor is it intended for use in determining or limiting the scope of the claimed subject matter.

In an embodiment of the present disclosure, a wearable device comprises an Inertial Measurement Unit (IMU) for recording motion data of a user wearing the wearable device. The wearable device further comprises a central processing unit (CPU) configured to implement a Machine Learning (ML) data pre-processing algorithm module for processing the motion data. The motion data is processed to perform at least one of: removing outliers exceeding physical limitations of human movement; synchronizing accelerometer and gyroscope timestamps; normalizing acceleration and angular velocity values; performing feature extraction on the motion data; and creating fixed-size sliding windows for gesture recognition. The wearable device further comprises an ML based position tracking and gesture recognition module for estimating a gesture of the user along with a confidence score of estimation, based on classification of the motion data.

In one aspect, the ML based position tracking and gesture recognition module includes an ML model trained using training data generated through time warping, and the training data is provided using a curriculum learning approach.

In one aspect, the ML model determines zero-velocity moments of the user from the motion data.

In one aspect, the ML model implements a fixed-threshold zero-velocity detector for collecting the motion data based on identification of movement of the user. The movement of the user is identified through processing of an angular velocity measured by a gyroscope, and an acceleration and hand orientation measured by an accelerometer, of the IMU.

In one aspect, the ML model is one of Logistic Regression (LR), Support Vector Machine (SVM), Random Forest (RF), simple LSTM, or Six-Layer LSTM (6-LSTM).

In one aspect, the ML model is a two-layer LSTM in which each layer performs an integration to account for errors present in a linear acceleration signal, and compensate the errors to predict a displacement estimate.

In one aspect, the two-Layer LSTM includes:

a first LSTM layer performing a first integration of the raw acceleration data to determine velocity estimates;

an error compensation layer processing the velocity estimates, gyroscope data, and zero-velocity detection features to produce error free values of the velocity estimates, the gyroscope data, and the zero-velocity detection; and a second LSTM layer performing a second integration using the error free values of the velocity estimates, the gyroscope data, and the zero-velocity detection, to determine a position estimate of the user.

In one aspect, the wearable device is a smart ring.

In one aspect, the wearable device comprises a Bluetooth (BLE) communication unit for communicating with another wearable device recording the motion data of the user.

In one embodiment, a method of estimating position of a user comprises providing, to a first LSTM layer of a two-layer LSTM model, raw acceleration data captured by an Inertial Measurement Unit (IMU) of a wearable device. The method further comprises performing, by the first LSTM layer, a first integration of the raw acceleration data to determine velocity estimates. The method further comprises providing, to an error compensation layer, the velocity estimates, gyroscope data, and zero-velocity detection features to obtain error free values of the velocity estimates, the gyroscope data, and the zero-velocity detection. The method further comprises providing, to a second LSTM layer, the error free values of the velocity estimates, the gyroscope data, and the zero-velocity detection to perform a second integration to determine a position estimate of the user.

In an aspect, the zero-velocity detection features include acceleration magnitude variance, angular velocity magnitude, orientation change rate, and window-based statistical features.

In an aspect, the first LSTM layer and the second LSTM layer are enhanced with peephole connections to introduce a direct connection between a cell state and gates.

In an aspect, bidirectional processing is implemented in the two-layer LSTM model for leveraging temporal context.

In an aspect, skip connections are provided between the first LSTM layer and the second LSTM layer to allow bypassing of one of the first LSTM layer and the second LSTM layer.

BRIEF DESCRIPTION OF THE DRAWINGS

The accompanying drawings constitute a part of the description and are used to provide further understanding of the present invention. Such accompanying drawings illustrate the embodiments of the present invention which are used to describe the principles of the present invention. The embodiments are illustrated by way of example and not by way of limitation in the figures of the accompanying drawings in which like references indicate similar elements. It should be noted that references to "an" or "one" embodiment in this invention are not necessarily to the same embodiment, and they mean at least one. In the drawings.

A more complete understanding of the present invention and its embodiments thereof may be acquired by referring to the following description and the accompanying drawings.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skills in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The proposed invention relates to a wearable device capable of tracking 3D position and gesture recognition of a user. The wearable device may include a smart watch, smart band, or an electronic ring. Although the details have been provided successively with reference to a smart ring merely for the sake of explanation, it must be understood that the invention could be fairly implemented in a similar manner using any other wearable device, such as the ones listed above.

Figure 1:
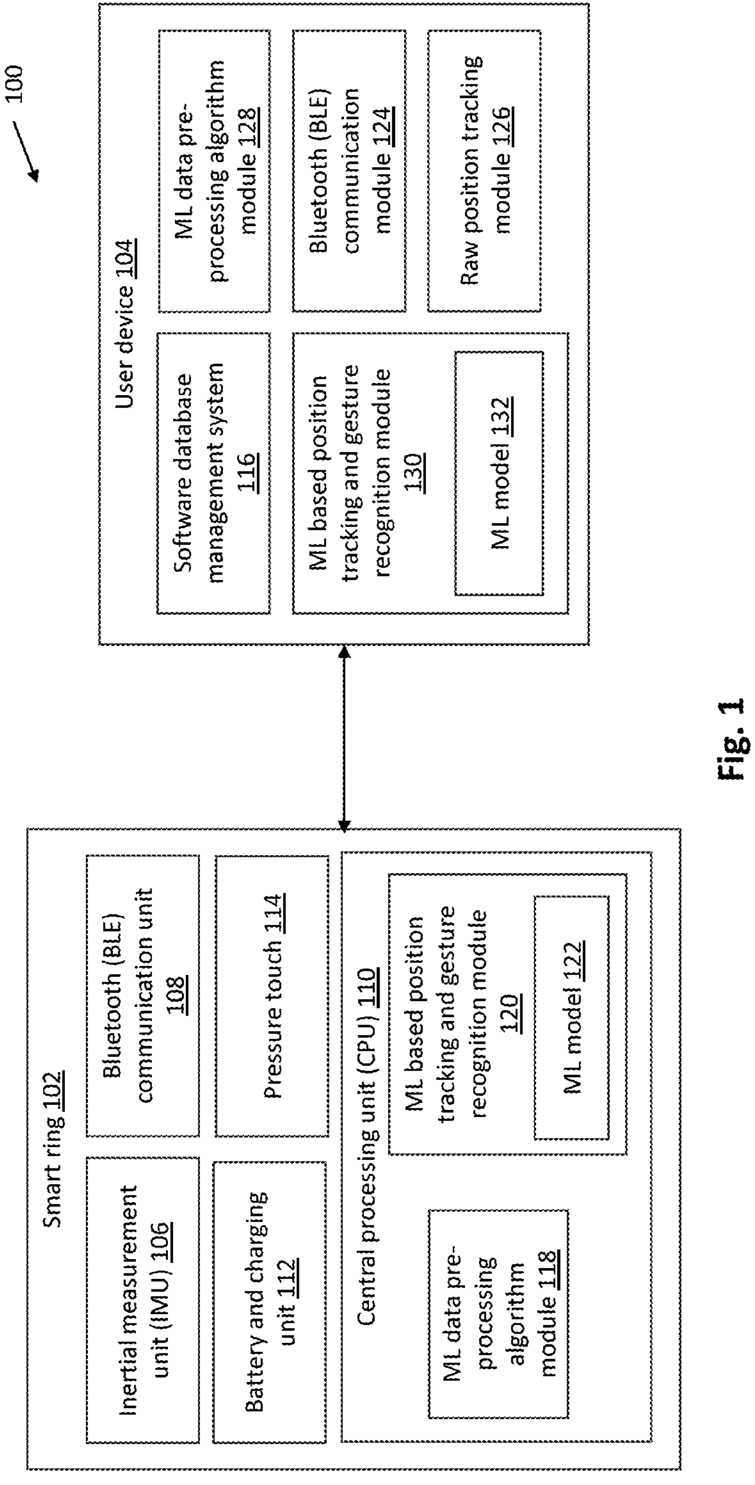
FIG. 1 illustrates a block diagram of a device capable of tracking 3D position and gesture recognition of a user, in accordance with an embodiment of the present invention.

FIG. 1 illustrates a block diagram of a device (100), such as a smart ring (102) capable of tracking 3D position and gesture recognition of a user, in accordance with an embodiment of the present invention. The device (100) includes a wearable device, such as smart ring (102), and a user device (104). The smart ring (102) may be made using a hypoallergenic material for allowing comfortable and continuous wear by a user. The smart ring (102) may include an Inertial Measurement Unit (IMU) (106), a Bluetooth (BLE) communication unit (108), a central processing unit (CPU) (110), a battery and charging unit/circuitry (112), a ML data pre-processing algorithm module (118), an ML based position tracking and gesture recognition module (120), ML model (122), and a pressure touch (114). The IMU unit (106) may include a gyroscope and an accelerometer. Further, the CPU (110) may exist and operate alongside a Machine Learning (ML) co-processor.

The user device (104) may include a software database management system (116), the ML data pre-processing algorithm module (128), the ML based position tracking and gesture recognition module (130), ML model (132), a Bluetooth (BLE) communication module (124) and a raw position tracking module (126). The user device (104) may be, but not limited to, a smartphone, a tablet, a PC, an online or offline server, or any other device in a spatial computing environment, a virtual environment, or an augmented reality environment. The ML data pre-processing algorithm module (128), the ML based position tracking and gesture recognition module (130), and the ML model (132) of the user device (104) may be analogous to the ML data pre-processing algorithm module (118), the ML based position tracking and gesture recognition module (120), and the ML model (122) of the smart ring (102).

A method of tracking 3D position and gesture recognition of a user is explained successively. The user wears one smart ring (102) in each hand to increase the flexibility and range of motion of the gestures. Each of the smart rings include the IMU (108) that may be used for continuously recording 6-axis motion data and providing the motion data to the CPU (112). The motion data may include accelerometer data (ax, ay, az) present in $m/s^2$, gyroscope data (gx, gy, gz) present in rad/s, and timestamps (t) present in milliseconds. The motion data may also be stored in a memory of the smart ring (102). Further, both the smart rings are connected to each other via the BLE communication unit (108) such that they can monitor the motion data collectively or independently of each other based on the requirement and user preference. Both the smart rings are analogous to the smart ring (102) of the device (100) and are used interchangeably in the following description. The smart ring (102) transmits the motion data to the user device (104) in real-time or in a pre-defined frequency, or when the motion data is requested by the user device (104). Further, the raw position tracking module (126) may determine a position of the user in a 3D environment based on the 6-axis motion data measured by the IMU (106). The raw position tracking module (126) tracks the position of the user in real-time to achieve precise interactions in the spatial computing applications. Below provided is a snippet of the 6-axis motion data collected by the IMU (106).

timestamp,ax,ay,az,gx,gy,gz
1000,−0.245,9.812,−0.131,0.012,−0.008,0.003
1010,−0.251,9.808,−0.128,0.015,−0.007,0.002
1020,−0.892,9.621,−0.445,1.234,0.892,−0.341

Further, the CPU (110) of the smart ring (102) processes the motion data using the ML data pre-processing algorithm module (118) of the smart ring (102). Specifically, the ML data pre-processing algorithm module (118) may format, clean, and arrange the motion data into a suitable format useable for further processing. Because the smart ring (102) has limited processing ability, the motion data may be processed by the smart ring (102) alone or in collaboration with the user device (104). Data cleaning may involve removing sensor noise using a low-pass filter, handling missing values through interpolation, and removing outliers that exceed the physical limitations of human movement. Data formatting may include synchronizing accelerometer and gyroscope timestamps, normalizing acceleration and angular velocity values, and creating fixed-size sliding windows for gesture recognition. Further, the ML data pre-processing algorithm module (118) may perform feature extraction, such as calculating the magnitude of acceleration and angular velocity, computing hand orientation using gyroscope data, and extracting statistical features e.g., mean, variance, and peak-to-peak values. Below provided is a snippet of pre-processed data generated by the data pre-processing algorithm module (118).

timestamp, acc_mag, gyro_mag, orientation_x, orientation_y, orientation_z, window_features
1000,9.815,0.015,0.025,0.989,−0.013,[0.245,0.892, 0.341]
1010,9.812,0.017,0.026,0.988,−0.012,[0.251,0.895, 0.344]
1020,9.678,1.563,0.092,0.982,−0.046,[0.892,1.234, 0.892]

The window_features may include metrics such as mean acceleration over the window, peak-to-peak variation, number of direction changes, variance of movement, and rate of change of acceleration or rotation.

Successively, the ML data pre-processing algorithm module (118) may provide the motion data, obtained through pre-processing, to the ML based position tracking and gesture recognition module (120). The ML based position tracking and gesture recognition module (120) may include a ML model (122). The ML model (122) may be a neural network classifier capable of predicting a 3D position and recognize gestures of the user by processing the motion data. Further details related to the ML model (122) are provided successively.

Details are now provided about the ML model (122). At first, smart rings (102) worn in both hands of a user are used to record and store motion data. The motion data may be stored and relayed to the user device (104), such as a server, upon receiving a request through Bluetooth. The smart rings (102) may be worn continuously by the user for several days, to record motion data frames for a large number of day-to-day activities. Stationary moments of the user serve as the basis for determining "zero-velocity" moments of the user. Such process aims at encompassing all types of zero-velocity movements and motion movements representing the user such as being stationary or halting a movement or stopping a movement in between, etc. Once sufficient amount of data for the 'zero-velocity' moments is recorded, the smart rings (102) are worn by multiple persons for the purpose of collecting labelled gesture data. For each supported gesture class in the ML model, multiple iterations of the gesture are done by the wearer while the data is recorded for said class. Once sufficient data is collected for a class, the same process is repeated for the next gesture class. In one implementation, 100 samples per gesture class may be collected. The gestures may include, but not limited to, snap, wave, shake, upward flick, downward flick, and rotate. Essentially, any common gesture for UI manipulation can be recognized.

Data augmentation through rotation and time warping may be performed for generation of training data used for training the ML model (122). Data augmentation through time warping is used to increase diversity of data by applying transformations while maintaining original structure of information. The transformations are typically based on altering the timing or speed of the motion data collected by the smart rings (102). Time warping involves shifting, stretching, or compressing a time axis of a time series, thus creating variations in the temporal features. Time warping assists in making the ML model (122) more robust to timing shifts, for gesture analysis, where the rate at which an event occurs may vary but the event itself remains the same.

The ML model (122) is trained using a curriculum learning approach. Curriculum learning involves introducing samples of training data in an increasing order of complexity. By providing the training data in such manner, the ML model (122) is able to learn and generalize well. Further, early stopping is performed based on validation loss i.e. training of the ML model (122) is stopped at an inflection point where the validation loss is lowest. Also, learning rate scheduling with warmup is implemented i.e. a warmup period is provided during which a learning rate of the ML model (122) is gradually increased from an initial value to a target value, over a certain number of epochs.

Further, the ML model (122) determines the moments in which IMU (106) is operating to predict the translational and rotational motion performed by the user. The motion of the user is captured by the gyroscope and the accelerometer of the IMU (106). The ML model (122) may implement a fixed-threshold zero-velocity detector that determines if the IMU (106) is experiencing movement or if it is stationary, and evaluates the existence of movement using the angular velocity measured by the gyroscope, and the acceleration and hand orientation measured by the accelerometer of the IMU (106). Once movement is detected, the movement data is classified by the classifier as being one class of the set of supported gesture classes, along with a confidence score for prediction/estimation. If the predicted class has a confidence score greater than a set threshold, the movement occurred is predicted to be of the gesture class predicted by the ML model (122). It should be noted that the zero-velocity moment means when the hands are not moving, so nothing needs to be predicted. The ML model (122) may be, but not limited to, Logistic Regression (LR), Support Vector Machine (SVM), Random Forest (RF), simple LSTM, or Six-Layer LSTM (6-LSTM).

Simple integration of acceleration to derive velocity does not work well with real IMU data due to sensor noise and bias errors that accumulate over time. For example, even a small bias error of 0.01 $m/s^2$ can lead to a velocity drift of 0.6 m/s in just one minute. Therefore, the ML model (122) utilizes a double integration technique to calculate the changes in position that occurred during the periods of movements. Specifically, the ML model (122) includes a Two-Layer LSTM in which each layer performs an integration that accounts for the errors present in the linear acceleration signal, and compensate them to predict a better displacement estimate. This approach not only mitigates the effects of sensor noise and bias but also enhances accuracy and robustness in position tracking and gesture recognition. In another embodiment, the ML model (122) may predict zero-velocity detection and displacement estimates for periods of movement simultaneously using a LSTM-based neural network.

Figure 2:
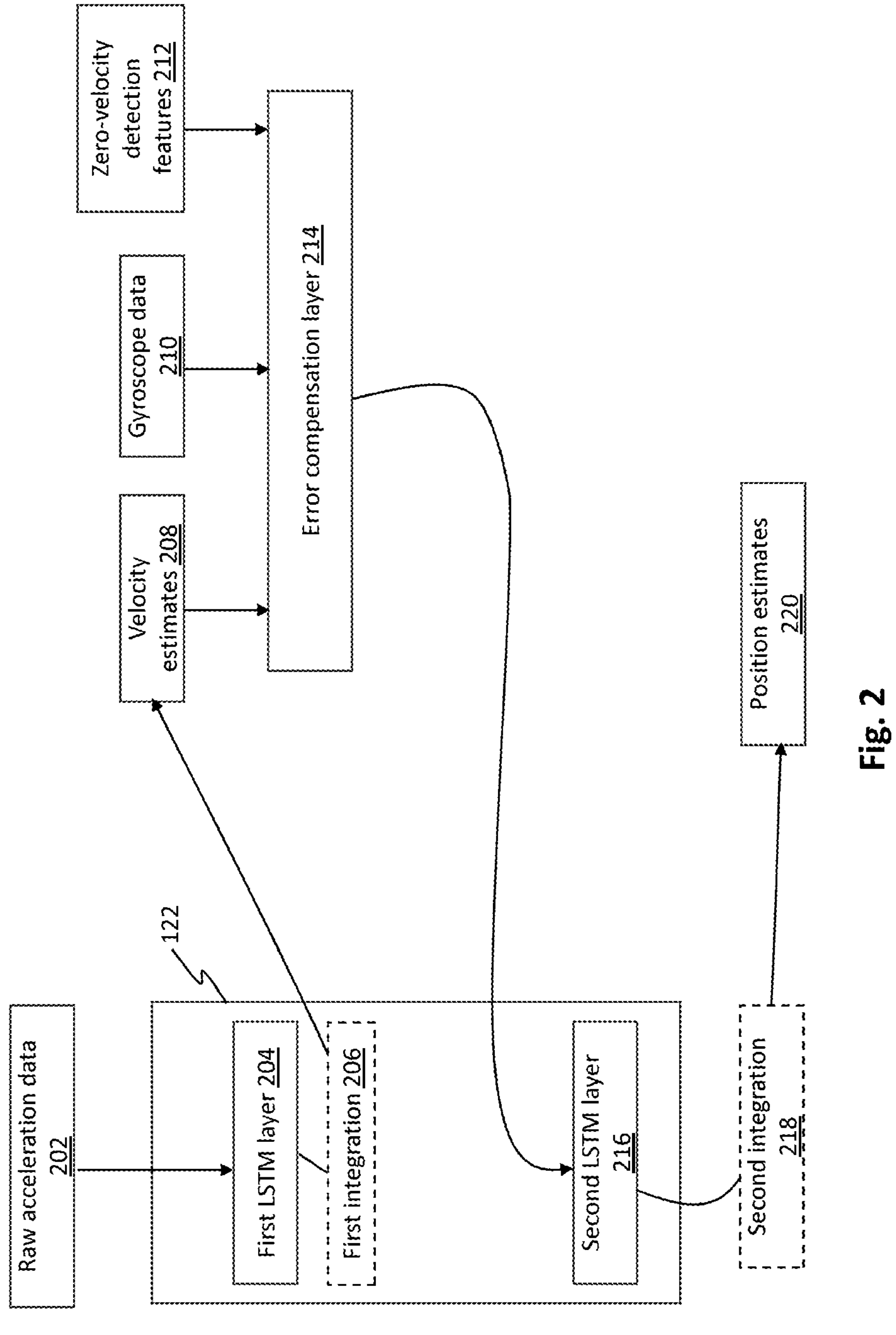
FIG. 2 illustrates a block diagram of a double integration technique used for determining position, in accordance with an embodiment of the present invention.

FIG. 2 illustrates a block diagram of a double integration technique used for determining position, in accordance with an embodiment of the present invention. Raw acceleration data (202) is provided to the ML model (122) having a two-Layer LSTM architecture. Specifically, the raw acceleration data (202) is provided to the first LSTM layer (204). The first LSTM layer (204) performs a first integration (206) of the raw acceleration data (202) to determine velocity estimates (208). The velocity estimates (208), along with gyroscope data (210) and zero-velocity detection features (212) are provided to an error compensation layer (214). The zero-velocity detection features (212) includes acceleration magnitude variance, angular velocity magnitude, orientation change rate, and window-based statistical features. The acceleration magnitude variance indicates stability in motion. The angular velocity magnitude identifies rotational stasis. The orientation change rate assists in monitoring subtle shifts in hand orientation. The window-based statistical features include metrics such as variance, mean, and direction change counts.

The error compensation layer (214) provides error free values of the velocity estimates (208), the gyroscope data (210), and the zero-velocity detection (212) to a second LSTM layer (216). The second LSTM layer (216) performs a second integration (218) using the velocity estimates (208), the gyroscope data (210), and the zero-velocity detection (212), to determine position estimates (220).

In some implementations, certain customizations were made to the ML model (122). One customization made to the ML model (122) includes enhancement of LSTM layers with peephole connections. The peephole connections introduce a direct connection between a cell state and gates (forget gate, input gate, and output gate), allowing the gates to directly look at and use the cell state while making decisions. This means that the forget gate, the input gate, and the output gate have access not only to a hidden state ($h^t_{-1}$) and an input ($x^t$) at a current time step but also to the cell state ($c^t_{-1}$) from a previous time step.

Another customization made to the ML model (122) includes implementing bidirectional processing for leveraging temporal context. Bidirectional processing assists in leveraging temporal context from both past and future time steps in a sequence. This approach enhances ability of the ML model (122) to capture information from the entire sequence rather than just from the past.

Yet another customization made to the ML model (122) includes implementing attention mechanism to focus on relevant motion segments. The attention mechanism enables the LSTM to focus on most relevant parts of input data. Parts of the input data that should be given more weight (or focus) based on their relevance are dynamically adjusted. Another customization made to the ML model (122) includes providing residual connections between LSTM layers. The residual connections (also called skip connections) between the LSTM layers allow bypassing one or more layers and add an original input of a layer directly to an output (the position estimate (220)), thereby addressing issues like vanishing gradients and facilitating better information flow.

The ML model (122) implemented using the above described methodology was also tested. For gesture recognition, an accuracy of 95%, a latency of less than 50 ms for classification, and a false positive rate of less than 1% was observed. Further, for position tracking, a displacement error of less than 2 cm over 10 s, an angular error of less than 2° over 10 s, and a drift of less than 1 cm/minute was observed.

In some implementations, the ML model (122) is quantized before loading into the smart ring (102). Quantization involves preparing a less complex version or a smaller version of the ML model (122). Quantization significantly reduces memory footprint and improves inference speed of the ML model (122) without causing substantial accuracy degradation. Further, pruning of the ML model (122) may be performed before loading into the smart ring (102). Pruning involves removing unimportant parameters from the ML model (122) to reduce size and enable more efficient model inference. Further, layer fusion can be performed for optimized inference i.e. multiple layers within the ML model (122) can be fused for saving inference time and for reduced memory consumption.

In some embodiments, the smart ring (102) may include the pressure touch (114) that may be a region that may distinguish between various levels of force being applied to its surface. In some embodiments, the pressure touch (114) allows for additional functions or commands to be executed depending on how hard the user presses on the pressure touch (114). The user may use pressure touch (114) for quick actions, accessing shortcuts, or enhancing gaming controls in a 3D spatial environment. The pressure touch (114) when enabled may allow for two-way input for the spatial computing applications mainly gestures and the force. Further, the pressure touch (114) may be customized to provide customized and accurate input to a user device (for example, a 2-second long press on the pressure touch may be customized to provide an input corresponding to pause a playing video). In an embodiment, the user may use the pressure touch in combination with the gestures for better control over the spatial computing applications.

One of the technical advantages of the proposed invention is to provide a wearable device capable of predicting gestures of a user in real-time. The proposed invention is capable to provide the interpreted gestures as input to a user device for various action within virtual or augmented reality environments. The proposed invention uses machine learning algorithms/models to predict gestures and movements, enabling intuitive and precise control in spatial computing environments. Additionally, the proposed invention offers a pressure touch region to directly interact in the virtual environment or the augmented reality environment.

One of the applications of the proposed invention is realized by providing real-time gestures as input to perform various operations in spatial computing. The proposed invention may be implemented in video games to interact more naturally with the characters using minimum hardware. The proposed invention may be implemented in defence sector for controlling unmanned aerial vehicles (UAV) and unmanned artillery using the gestures, minimizing the direct involvement of soldiers in combat.

A method of tracking 3D position and gesture recognition of a user is described. The method includes collecting motion data using a 6-axis IMU. The 6-axis IMU provides acceleration and angular velocity along three axes (x, y, z). The IMU consists of a 3-axis accelerometer and a 3-axis gyroscope providing two different measurements along each of the three axes for a total of six measurements. Further, the IMU is embedded in the smart ring, and the user usually wears a smart ring in both hands to accurately collect motion data of both hands independently and simultaneously. The IMU measures and reports raw or filtered angular rate and specific force or acceleration experienced by the user. Further, the measured data is also transmitted to the user device in real-time.

Further, the method includes analysing motion data from the IMU using machine learning algorithms to predict gestures and movements of the user. The ML model determines a plurality of zero velocity moments by determining if the IMU velocity is zero or the user is not performing any motion. Further, when a motion is detected by the smart ring, the ML model predict the translational and rotational motion of the user across all the axis into various gestures classes. The ML model may use the double integration technique to minimize error in predicting the movement estimates of the user. The method includes receiving input from a pressure touch region of the smart ring. The pressure touch region acts as a touch screen to provide input in form of pressure applied to the region and the time duration of the touch. The input from pressure touch may act as an additional input directly to the spatial computing applications.

In an embodiment, the ML model may be implemented in the user device for processing the motion data to interpret the gestures of the user. The user device may predict the gestures of the user based on the motion data independently from the smart ring. The user device may use the motion data from the smart ring to implement its own gesture classes, tailored for more broad and complicated applications, or specific use cases. In another embodiment, the user device may verify the predictions made by the smart ring by predicting the gestures of the user and then comparing it to the smart ring prediction. Further, the user device may implement a ML model or a prediction system which may not include ML model.

In an exemplary embodiment, a user wears a smart ring in each of his hands that comprises an IMU that monitors the motion of the hands using an accelerometer and a gyroscope. The smart ring then feeds the motion data to a ML model and to the user device in real time. The ML model then determines the zero-velocity moment of the user. Let's say the user raises his right hand, the ML model determines the instant just after the user start raising the hand, and the instant just after the user stops raising the hand along with a timestamp, and orientation. Further, the ML model determines the gesture class of the movement event using rotational and translational motion of the hand, timestamps and orientation. In another embodiment, the user device may implement the ML model to process the motion data of the user corresponding to a new class of gesture, or to verify the correctness of the gesture predicted by the smart ring. The user may also interact with the pressure touch region of the smart rings to provide additional input to the user device.

The method further includes transmitting the predicted gesture data for the spatial computing application. The predicted gestures may be used in a variety of applications like interacting in a mixed reality environment, providing inputs to a computer, playing interactive games, etc.

We claim:

1. A wearable device, comprising:
- an Inertial Measurement Unit (IMU) for recording motion data of a user wearing the wearable device;
- a central processing unit (CPU) configured to implement:
  - a Machine Learning (ML) data pre-processing algorithm module that processes the motion data to perform at least one of:
    - removing outliers exceeding physical limitations of human movement;
    - synchronizing accelerometer and gyroscope timestamps;
    - normalizing acceleration and angular velocity values;
    - performing feature extraction on the motion data; and
    - creating fixed-size sliding windows for gesture recognition; and
  - an ML based position tracking and gesture recognition module that estimates a gesture of the user along with a confidence score of estimation, based on classification of the motion data
  - wherein the ML based position tracking and gesture recognition module includes an ML model trained using training data generated through time warping, and wherein the training data is provided using a curriculum learning approach; and
  - wherein the ML model is a two-layer Long Short-term Memory (LSTM) including a plurality of layers in which each laver of the plurality of layers performs an integration to account for errors present in a linear acceleration signal, and compensates the errors to predict a displacement estimate.

2. The wearable device according to claim 1, wherein the ML model determines zero-velocity moments of the user from the motion data.

3. The wearable device according to claim 1, wherein the ML model implements a fixed-threshold zero-velocity detector for collecting the motion data based on identification of movement of the user, and
- wherein the movement of the user is identified through processing of an angular velocity measured by a gyroscope, and an acceleration and hand orientation measured by an accelerometer, and wherein the IMU includes the gyroscope and the accelerometer.

4. The wearable device according to claim 1, wherein the two-layer LSTM includes:
- a first LSTM layer performing a first integration of raw acceleration data to determine velocity estimates;
- an error compensation layer processing the velocity estimates, gyroscope data, and zero-velocity detection features to produce corrected values of the velocity estimates, the gyroscope data, and the zero-velocity detection features; and
- a second LSTM layer performing a second integration using the corrected values of the velocity estimates, the gyroscope data, and the zero-velocity detection features, to determine a position estimate of the user.

5. The wearable device according to claim 1, wherein the wearable device is a smart ring.

6. The wearable device according to claim 5, further comprises a Bluetooth (BLE) communication unit for communicating with another wearable device recording the motion data of the user.

7. A method of estimating position of a user, comprising:
- providing, to a first LSTM layer of a two-layer LSTM model, raw acceleration data captured by an Inertial Measurement Unit (IMU) of a wearable device;
- performing, by the first LSTM layer, a first integration of the raw acceleration data to determine velocity estimates;

providing, to an error compensation layer, the velocity estimates, gyroscope data, and zero-velocity detection features to obtain corrected values of the velocity estimates, the gyroscope data, and the zero-velocity detection features; and providing, to a second LSTM layer, the corrected values of the velocity estimates, the gyroscope data, and the zero-velocity detection features to perform a second integration to determine a position estimate of the user.

8. The method according to claim 7, wherein the zero-velocity detection features include acceleration magnitude variance, angular velocity magnitude, orientation change rate, and window-based statistical features.

9. The method according to claim 7, further comprising enhancing the first LSTM layer and the second LSTM layer with peephole connections to introduce a direct connection between a cell state and gates.

10. The method according to claim 7, further comprising implementing bidirectional processing for leveraging temporal context.

11. The method according to claim 7, further comprising providing skip connections between the first LSTM layer and the second LSTM layer to allow bypassing of one of the first LSTM layer and the second LSTM layer.

* * * * *